United States Patent
Yeom

(10) Patent No.: US 11,133,683 B2
(45) Date of Patent: Sep. 28, 2021

(54) BATTERY PACK, METHOD FOR MANAGING BATTERY PACK, AND VEHICLE COMPRISING BATTERY PACK

(71) Applicant: Samsung SDI Co., Ltd., Yongin-si (KR)

(72) Inventor: Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 150 days.

(21) Appl. No.: 16/080,637

(22) PCT Filed: Nov. 6, 2017

(86) PCT No.: PCT/KR2017/012472
§ 371 (c)(1),
(2) Date: Aug. 28, 2018

(87) PCT Pub. No.: WO2018/139740
PCT Pub. Date: Aug. 2, 2018

(65) Prior Publication Data
US 2019/0089168 A1  Mar. 21, 2019

(30) Foreign Application Priority Data
Jan. 24, 2017  (KR) .................. 10-2017-0011181

(51) Int. Cl.
*H02J 7/00* (2006.01)
*B60R 16/033* (2006.01)
(Continued)

(52) U.S. Cl.
CPC .......... *H02J 7/0021* (2013.01); *B60R 16/033* (2013.01); *H01M 10/425* (2013.01);
(Continued)

(58) Field of Classification Search
CPC ..... Y02E 60/12; H01M 2/1055; H01M 10/46; H01M 10/425; H01M 10/4207;
(Continued)

(56) References Cited

U.S. PATENT DOCUMENTS 5,355,071 A * 10/1994 Ishida .................. H02J 7/1423
320/110
9,789,776 B2  10/2017 Lee et al.
(Continued)

FOREIGN PATENT DOCUMENTS

CN         104859565 A    8/2015
KR    10-2013-0078028 A    7/2013
(Continued)

OTHER PUBLICATIONS

Extended European Search Report for corresponding European Patent Application No. 17894067.2, dated May 18, 2020, 7 pages.
(Continued)

*Primary Examiner* — Nathaniel R Pelton
*Assistant Examiner* — Mohammed J Sharief
(74) *Attorney, Agent, or Firm* — Lewis Roca Rothgerber Christie LLP

(57) ABSTRACT

Disclosed is a battery pack including: at least one battery module including a plurality of battery cell; and a battery management system (BMS) configured to determine an operation mode of a battery pack according to an enabled switch signal between at least two switch signals, which wake up the battery pack, and control the battery pack according to the determined operation mode.

20 Claims, 6 Drawing Sheets

(51) Int. Cl.
*H01M 10/42* (2006.01)
*H02J 7/02* (2016.01)
(52) U.S. Cl.
CPC ....... *H01M 10/4207* (2013.01); *H02J 7/0029* (2013.01); *H02J 7/0031* (2013.01); *H02J 7/02* (2013.01); *H01M 2010/4271* (2013.01); *H01M 2220/20* (2013.01); *H02J 7/00304* (2020.01)
(58) Field of Classification Search
CPC ....... H01M 2220/20; H01M 2010/4271; H02J 7/0045; H02J 7/0021; H02J 7/0031; H02J 7/0029; H02J 7/02; H02J 7/00304; B60R 16/033
USPC ......................................................... 320/112
See application file for complete search history.

(56) References Cited

U.S. PATENT DOCUMENTS

| | | | | |
|---|---|---|---|---|
| 2007/0126407 A1* | 6/2007 | Loong | ............... | G05F 5/00 323/210 |
| 2011/0049977 A1* | 3/2011 | Onnerud | ............... | B60L 3/0046 307/9.1 |
| 2011/0050169 A1* | 3/2011 | Akiba | ............... | H02J 7/0016 320/109 |
| 2011/0187325 A1* | 8/2011 | Lin | ............... | H02J 7/00 320/116 |
| 2012/0139337 A1* | 6/2012 | Kim | ............... | B60L 50/64 307/9.1 |
| 2014/0217973 A1 | 8/2014 | Lee et al. | | |
| 2015/0165926 A1* | 6/2015 | Kim | ............... | B60L 58/22 320/118 |
| 2015/0239351 A1* | 8/2015 | Itou | ............... | F02D 41/062 307/9.1 |
| 2016/0064958 A1 | 3/2016 | Jung et al. | | |
| 2016/0164328 A1 | 6/2016 | Kim | | |

FOREIGN PATENT DOCUMENTS

| | | |
|---|---|---|
| KR | 10-2014-0100338 A | 8/2014 |
| KR | 10-1480090 B1 | 1/2015 |
| KR | 10-2015-0077771 A | 7/2015 |
| KR | 10-1594925 B1 | 2/2016 |
| KR | 10-2016-0027847 A | 3/2016 |

OTHER PUBLICATIONS

English translation of Office action and Search Report issued in related Chinese Application No. 201780021488.8, dated Jan. 5, 2021, 16 pages.

Office action issued in corresponding Korean Patent Application No. 10-2017-0011181, dated Apr. 23, 2021, 10 pages.

\* cited by examiner

BATTERY PACK, METHOD FOR MANAGING BATTERY PACK, AND VEHICLE COMPRISING BATTERY PACK

CROSS-REFERENCE TO RELATED APPLICATION(S)

This application is a National Phase Patent Application of International Patent Application Number PCT/KR2017/012472, filed on Nov. 6, 2017, which claims priority of Korean Patent Application No. 10-2017-0011181, filed Jan. 24, 2017. The entire contents of both of which are incorporated herein by reference.

TECHNICAL FIELD

The present disclosure relates to a battery pack, a method of managing the battery pack, and a vehicle including the battery pack.

BACKGROUND ART

Regardless of use of a battery pack, a battery pack in the related art is always maintained in a power-on state. When a problem relating to safety is generated in a battery pack during the use of the battery pack, an input/output path of the battery pack is off.

When the battery pack is always in the power-on state, a problem in view of safety may be generated due to a mistake by a user when the battery pack is combined with or separated from a system. The system includes a device, which is capable of electrically supplying and receiving power with the battery pack, and the like.

Further, a battery management system (BMS) included in the battery pack is also operated regardless of the use of the battery pack, so that a leakage current is generated. When such a situation is maintained for a long time, self-discharge through the BMS is generated, so that the battery pack may be lost.

DISCLOSURE

Technical Problem

The present invention has been made in an effort to provide a battery pack, which additionally secures safety when a new battery pack is applied to a vehicle, so that it is possible to maximize usability of a lithium battery, a method of managing the battery pack, and a vehicle including the battery pack.

Technical Solution

An exemplary embodiment of the present invention provides a battery pack, including: at least one battery module including a plurality of battery cell; and a battery management system (BMS) configured to determine an operation mode of a battery pack according to an enabled switch signal between at least two switch signals, which wake up the battery pack, and control the battery pack according to the determined operation mode.

The BMS may include: a power enable switch, which is switched according to the at least two switch signals; a calculating unit, which determines the operation mode according to an enabled switch signal between the at least two switch signals; and a converter, which converts an input voltage supplied through the power enable switch, generates an output voltage, and supplies the generated output voltage to the calculating unit.

The BMS may further include an OR gate, which generates a power enable signal according to the at least two switch signals and a power keeping signal.

The calculating unit may be synchronized to the enabled switch signal between the at least two switch signals and generate the power keeping signal. The calculating unit may generate the power keeping signal after a predetermined delay time elapses from a time, at which one of the at least two switch signals is enabled.

The OR gate may include: at least two capacitors including one electrodes, respectively, to which the at least two switch signals are input, respectively; at least two first diodes including anodes connected to the other electrodes of the at least two capacitors, respectively, and cathodes connected to a first node; and a second diode including an anode, to which the power keeping signal is supplied, and a cathode connected to the first node. The power enable signal may be determined according to a voltage of the first node.

The enabled switch signal between the at least two switch signals may pass through a corresponding capacitor between at least two capacitors and a corresponding first diode between the at least two first diodes may be electrically conducted by the signal passing through the corresponding capacitor, so that a level of the power enable signal may be increased to a high level.

The calculating unit may be synchronized to the enabled switch signal between the at least two switch signals and generate the power keeping signal, and the second diode may be electrically conducted by the power keeping signal, so that the level of the power enable signal may be maintained with the high level.

The BMS may include a controller area network (CAN) transceiver, which transmits information about the battery pack to the outside and receives information from the outside through CAN communication, and the converter may supply the output voltage to the CAN transceiver.

The BMS may include: a first diode including an anode, to which a voltage of a first terminal is input, and a cathode, which is connected to a first node; and a second diode including an anode, to which a voltage of a second terminal is input, and a cathode, which is connected to the first node, and enable levels of the at least two switch signals may be determined according to a voltage supplied through an electrically conducted diode between the first diode and the second diode.

When the at least two switch signals are enabled, the BMS may determine an operation mode of the battery pack according to a priority of the at least two switch signals.

Another exemplary embodiment of the present invention provides a method of managing a battery pack including at least one battery module including a plurality of battery cells, the method including: receiving an enabled switch signal between at least two switch signals, which wake up the battery pack; determining an operation mode of a battery pack according to the received enabled switch signal; and controlling the battery pack according to the determined operation mode.

The method may further include: switching a power enable switch according to the at least two switch signals; and converting an input voltage supplied through the power enable switch and generating an output voltage The switching may include: being synchronized to the enabled switch signal between the at least two switch signals and generating the power keeping signal; generating a power enable signal according to the at least two switch signals and the power keeping signal; and switching the power enable switch according to the power enable signal.

The determining of the operation mode includes, when the at least two switch signals are enabled, determining the operation mode of the battery pack according to a priority of the at least two switch signals.

Still another exemplary embodiment of the present invention provides a vehicle including: a battery pack, which includes at least one battery module including a plurality of battery cells, and determines an operation mode according to an enabled switch signal between at least two switch signals; and a switch unit, which generates the at least two switch signals according to an external operation.

The external operation may include at least one of an operation of turning on an ignition key of the vehicle, an operation of turning on a switch controlling the vehicle to move for tow, and an operation of stepping on an accelerator pedal for adjusting a speed of the vehicle.

The battery pack may be woken up according to the at least two switch signals.

The switch unit may include at least two switches, each of which includes one end connected to a voltage supplied from the battery pack, and the at least two switch signals are supplied to the battery pack when the at least two switches are turned on.

The battery pack may include: at least two capacitors including one electrodes connected to the other ends of the at least two switches, respectively; and at least two diodes connected to the other electrodes of the at least two capacitors, respectively.

Advantageous Effects

The present invention provides a battery pack, which additionally secures safety when a new battery pack is applied to a vehicle, so that it is possible to maximize usability of a lithium battery, a method of managing the battery pack, and a vehicle including the battery pack.

MODE FOR INVENTION

Figure 1:
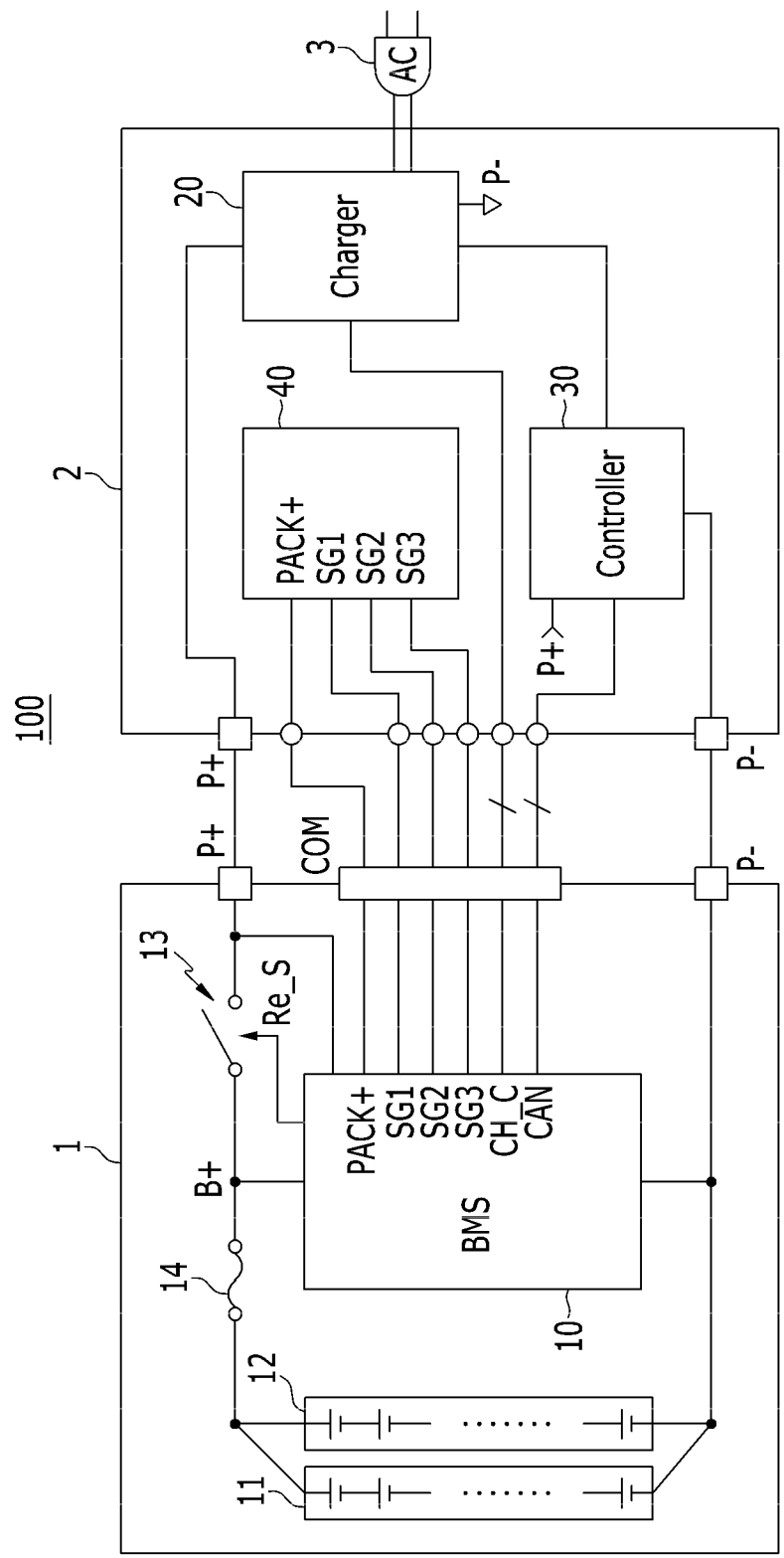
FIG. 1 is a diagram illustrating a battery pack according to an exemplary embodiment and a configuration of a part of a vehicle including the battery pack.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. Unless explicitly described to the contrary, the word "comprise" and variations such as "comprises" or "comprising", will be understood to imply the inclusion of stated elements but not the exclusion of any other elements.

FIG. 1 is a diagram illustrating a battery pack according to an exemplary embodiment and a configuration of a part of a vehicle including the battery pack.

As illustrated in FIG. 1, a vehicle 100 according to an exemplary embodiment includes a battery pack 1 and other configurations 2 of a vehicle, which are electrically connected with the battery pack. In FIG. 1, the configurations 2 include a charger 20, a controller 30, and a switch unit 40. The configurations 2 illustrated in FIG. 1 are illustrated to include only partial configurations, which are electrically connected with a battery management system (BMS) 10 for convenience of the description, but the present invention is not limited thereto.

The battery pack 1 includes the BMS 10, two battery modules 11 and 12, a relay 13, and a fuse 14. FIG. 1 illustrates that the battery pack 1 includes the two battery modules 11 and 12, but this is simply illustrative for the description, and the present invention is not limited thereto. Further, it is illustrated that the vehicle 100 includes the charger 20, but the charger 20 may be implemented as a separate configuration from the vehicle 100.

The battery pack 1 supplies power to the vehicle 100. Each of the two battery modules 11 and 12 includes a plurality of battery cells, and is connected between a P+ terminal and a P− terminal in parallel. Each of the two battery modules 11 and 12 may detect information (for example, a cell voltage and a cell temperature) about the plurality of cells, and information (for example, a current flowing in the battery module, a voltage of the battery module, and a temperature of the battery module) about the battery module and transmit the detected information to the BMS 10. Hereinafter, the information about the plurality of cells and the information about the battery module are referred to as battery detection information.

The fuse 14 may be connected between the two battery modules 11 and 12 and a B+ terminal and be opened when an overcurrent flows.

The relay 13 is connected between the B+ terminal and the P+ terminal, and is operated under the control of the BMS 10. For example, the relay 13 is switched according to a relay signal Re_S output from the BMS 10. When a charging operation starts and power is supplied from the charger 20, the BMS 10 may generate the relay signal Re_S, which turns on the relay 13.

The BMS 10 may receive the battery detection information from each of the two battery modules 11 and 12, transmit the battery detection information through communication with the charger 20 and the controller 30 of the vehicle 100, and receive information required for management of the battery from the charger 20 and the controller 30. For example, the communication scheme between the BMS 10 and the controller 30 may be controller area network (CAN) communication.

The battery pack may include a COM port, and the COM port may include a plurality of terminals for the CAN communication, and a plurality of terminals for the communication with the BMS 10 and the charger 20. The P+ terminal of the battery pack 1 is connected with a P+ terminal of the vehicle 100, and the P− terminal of the battery pack 1 is connected with a P− terminal of the vehicle 100. Although not illustrated in FIG. 1, the COM port may include a terminal for transmitting a charge control signal CH_C, a ground terminal for the charge control signal CH_C, a CAN power supply terminal for the CAN communication, a CAN H terminal, a CAN L terminal, and CAN ground terminals.

When the charger 20 is turned on, a state of the BMS 10 is changed from a shut-down state to a wake-up state, and when the controller 30 becomes an internal lock state, the BMS 10 may generate the charge control signal CH_C controlling an operation of the charger 20 based on the battery detection information received from each of the two battery modules 11 and 12.

The BMS 10 may detect the states of the battery modules 11 and 12 based on the battery detection information, notify the charger 20 that the battery modules 11 and 12 are in the chargeable state, and generate the charge control signal CH_C according to the charging state. The charge control signal CH_C is a pulse width modulation signal, and the BMS 10 adjusts an on-duty ratio of the charge control signal CH_C according to the charging state.

For example, when both the battery modules 11 and 12 are in the full charge state, the BMS 10 may generate the charge control signal CH_C of the on-duty ratio of 0% directing full charge.

In the charge start states of the battery modules 11 and 12, the BMS 10 may generate the charge control signal CH_C of the on-duty ratio of 12% directing pre-charge. The pre-charge means that the battery pack 1 is charged with a predetermined first current according to a constant current (CC) mode. The charge start state is a state, in which a minimum cell voltage at a charge start point is equal to or smaller than a predetermined first voltage, and when the minimum cell voltage reaches a predetermined second voltage after the charge start, the charge start state is terminated.

After the charge start state is terminated, the BMS 10 may generate the charge control signal CH_C of the on-duty ratio of 38% directing normal charge. The normal charge discriminated from the pre-charge means that the battery pack 1 is charged with a predetermined second current according to the CC mode, and the second current has a higher level than that of the first current. The normal charge may further include a case where the battery pack 1 is charged with a predetermined voltage according to a constant voltage (CV) mode.

The charger 20 may control a current supplied to the battery pack 1 according to the on-duty ratio of the charge control signal CH_C.

The pre-charge may also be applied in the state where a temperature of each of the battery modules 11 and 12 deviates from a predetermined normal temperature range, as well as the charge start state. The BMS 10 may generate the charge control signal CH_C directing the pre-charge in the state where the temperature of each of the battery modules 11 and 12 deviates from the normal temperature range. The BMS 10 may generate the charge control signal CH_C of the on-duty ratio directing the normal charge in the state where the temperature of each of the battery modules 11 and 12 is within the normal temperature range.

The BMS 10 may detect defects of the battery modules 11 and 12 based on the battery detection information. The defects of the battery modules 11 and 12 include various states, such as the state where there is a cell having an overvoltage or a low voltage among the cells included in the battery modules 11 and 12, the state where the battery modules 11 and 12 are in an over-temperature state or a low-temperature state, the state where an overcurrent flows in the battery pack 1, and the state where there is an over-discharged cell among the cells included in the battery modules 11 and 12, in which the battery 1 cannot be normally operated. When the BMS 10 detects the defects of the battery modules 11 and 12, the BMS 10 may transmit the detected defects to the charger 20 and make the charge operation be stop. In this case, in order to notify the defect, the BMS 10 may generate the charge control signal CH_C of the on-duty ratio of 100%, and generate the relay signal Re-S turning off the relay 13.

When a plug 3 is connected to a plug socket, to which external power is supplied, the charger 20 is plugged in and the charger 20 is turned on. When the charger 20 is turned on, power is supplied to the BMS 10 and the controller 30 through the P+ terminal of the charger 20 for a predetermined time, and an internal lock signal I/L is transmitted to the controller 30. When the charger 20 receives the information indicating that the battery pack 1 is in the chargeable state from the BMS 10, the charger 20 supplies charging power to the battery pack 1 according to the charge control signal CH_C.

The controller 30 is the configuration controlling all of the operations of the vehicle, and may control an operation of the vehicle 100 in consideration of information about the battery pack 1 received from the BMS 10. The information about the battery pack 1 includes the battery detection information. The controller 30 and the BMS 10 may mutually transceive information required for the CAN communication.

When the charger 20 is turned on, the state of the controller 30 is changed from the shut-down state to the wake-up state, and when the controller 30 receives the internal lock signal I/L, the controller 30 transmits an output corresponding to the internal lock signal I/L to the BMS 10. The controller 30 stops the operation of the vehicle 100 according to the internal lock signal I/L.

The switch unit 40 turns on a switch corresponding to an operation input to the vehicle 100 from the outside. The switch unit 40 may be supplied with voltage PACK+ from the battery pack 1, and output switch signals SG1 to SG3 of on-levels according to the turned on switch. The on-level may depend on voltage PACK+.

The operation input to the vehicle 100 from the outside may include an operation of turning on an ignition key of the vehicle 100, an operation of turning on a switch controlling the vehicle 10 to move for tow, an operation of stepping on a pedal for adjusting a speed of the vehicle 100, and the like. When the ignition key is turned on, an ignition switch of the switch unit 40 is turned on, so that the switch signal SG1 may have the on-level. When the control switch is turned on for tow, a two switch of the switch unit 40 is turned on, so that the switch signal SG2 may have the on-level. When the pedal is stepped on, a pedal switch of the switch unit 40 is turned on, so that the switch signal SG3 may have the on-level.

The COM port of the BMS 10 may further include a terminal for receiving the switch signals SG1 to SG3. The BMS 10 may differently control an operation mode of the battery pack 1 according to the switch signals SG1 to SG3. The BMS 10 may determine an operation mode of the battery pack 1 based on a signal enabled to a high level among the switch signals SG1 to SG3. The switch signals SG1 to SG3 are signals, which are capable of waking up the battery pack 1. In the wake-up state, the BMS 10 may be turned on, and a CAN transceiver 105 (see FIG. 2) for the CAN communication may be turned on together.

The BMS 10 may differently control a voltage, a current, a temperature, and the like of the battery pack 1 according to the determined operation mode. Further, when the two or more signals among the switch signals SG1 to SG3 are enabled, the BMS 10 may set priorities of the switch signals SG1 to SG3, and control the battery pack 1 in an operation mode based on the switch signal having a high priority.

Further, the BMS 10 may differently control a control condition for automatic shut-down according to the enabled signal among the switch signals SG1 to SG3. The automatic shut-down means an operation, in which the battery pack 1 is shut down when a current flowing in the battery pack 1 is equal to or smaller than a predetermined threshold current and is maintained for a predetermined threshold time. When the battery pack 1 is shut-down, the relay 13 is turned off and the BMS 10 is also turned off.

Figure 2:
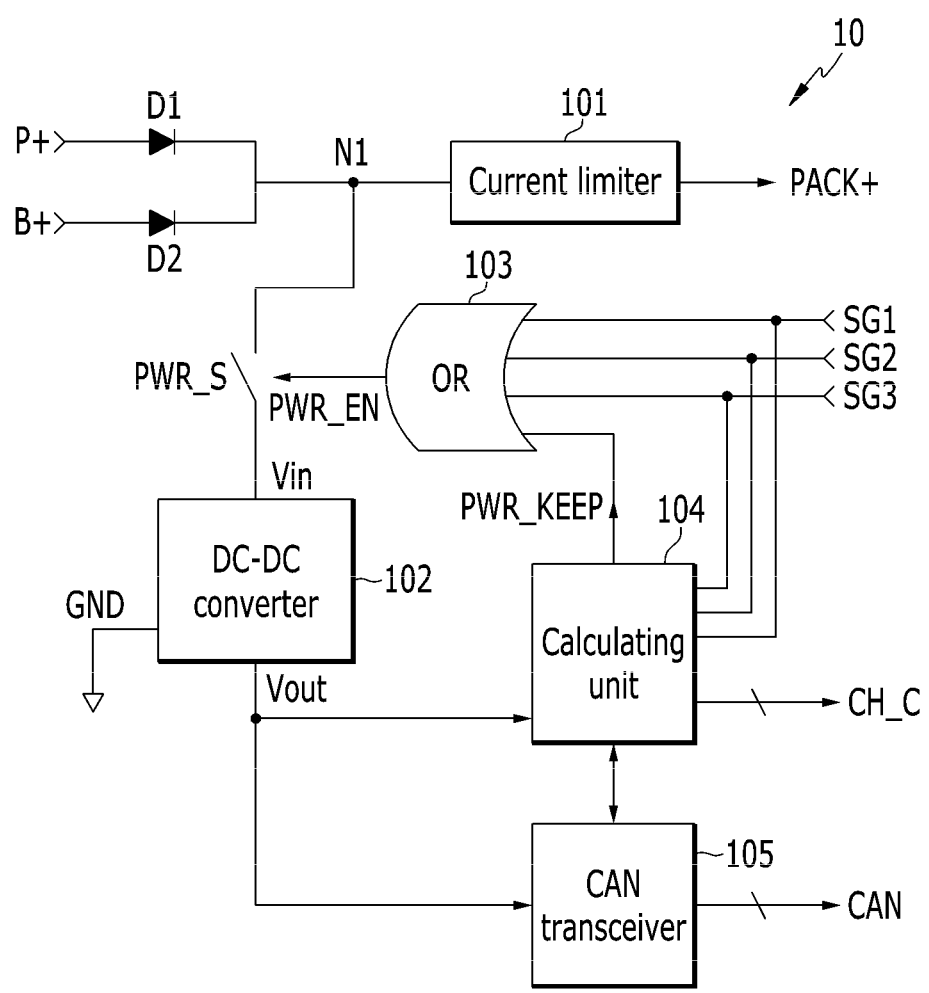
FIG. 2 is a diagram illustrating a configuration of a part of a battery management system (BMS) according to an exemplary embodiment.

FIG. 2 is a diagram illustrating a configuration of a part of the BMS according to the exemplary embodiment.

As illustrated in FIG. 2, the BMS 10 includes a current limiter 101, a converter 102, an OR gate 103, a calculating unit 104, the CAN transceiver 105, a power enable switch PWR_S, and two diodes D1 and D2.

An anode of the diode D1 is connected to the P+ terminal, an anode of the diode D2 is connected to the B+ terminal, and cathodes of the diode D1 and the diode D2 are connected to a node N1. When the diode D1 is electrically conducted by a voltage of the P+ terminal, the voltage of the P+ terminal is output as voltage PACK+, and when the diode D2 is electrically conducted by a voltage of the B+ terminal, the voltage of the B+ terminal is output as voltage PACK+. Then, a higher voltage between the voltages of the P+ terminal and the B+ terminal is output as voltage PACK+ through the current limiter 101. The current limiter 101 limits a current, which flows from the P+ terminal or the B+ terminal to the switch unit 40, not to exceed a predetermined threshold value.

The power enable switch PWR_S is connected between the node N1 and an input terminal of the converter 102, and when the power enable switch PWR_S is turned on, an input voltage Vin is supplied to the converter 102. The power enable switch PWR_S is switched by a power enable signal PWR_EN output from the OR gate 103. For example, the power enable switch PWR_S may be turned on by the power enable signal PWR_EN of a high level, and the power enable switch PWR_S may be turned off by the power enable signal PWR_EN of a low level.

The converter 102 receives the input voltage Vin, converts the input voltage Vin, and generates an output voltage Vout. The output voltage Vout may be a power voltage of the calculating unit 104 and the CAN transceiver 105.

The calculating unit 104 receives the switch signals SG1 to SG3, and determines an operation mode of the battery pack 1 according to the enabled switch signal among the switch signals SG1 to SG3. For example, when the switch signal SG1 and the switch signal SG2 are enabled and the switch signal SG3 is in a disable state, the calculating unit 104 determines the mode of the battery pack 1 to a RUN mode. Based on the RUN mode, power is supplied to the vehicle 100 from the battery pack 1. Otherwise, when the switch signal SG1 and the switch signal SG3 are enabled, the calculating unit 104 determines the mode of the battery pack 1 to a charge mode. Based on the charge mode, the battery pack 1 may be charged by power supplied from the charger 20.

Further, the calculating unit 104 may differently control a control condition for the automatic shut-down according to the enabled switch signal among the switch signals SG1 to SG3. For example, in the RUN mode, when a current supplied from the battery pack 1 to the vehicle 100 is equal to or smaller than a predetermined first threshold value and is maintained for a first time, the calculating unit 104 may determine the mode of the battery pack 1 to the automatic shut-down mode. Otherwise, in the charge mode, when a current supplied from the charger 20 to the battery pack 1 is equal to or smaller than a predetermined second threshold value and is maintained for a second time, the calculating unit 104 may determine the mode of the battery pack 1 to the automatic shut-down mode. The first time may be longer than the second time.

When all of the switch signals SG1 to SG3 are disabled, the calculating unit 104 may determine the mode of the battery pack 1 to the automatic shut-down mode.

When the calculating unit 104 determines the mode of the battery pack 1 to the automatic shut-down mode, the calculating unit 104 generates a power keeping signal PWR_KEEP which turns off the power enable switch PWR_S. For example, when the level of the power enable signal PWR_EN is increased to a high level, the calculating unit 104 generates the power keeping signal PWR_KEEP of a high level after a predetermined delay time. The calculating unit 104 may determine the mode of the battery pack 1 to the automatic shut-down mode, and generate the power keeping signal PWR_KEEP at a low level. When the power enable switch PWR_S is turned off, a power voltage supplied to the calculating unit 104 and the CAN transceiver 105 is blocked, so that the BMS 10 is turned off and the relay 13 is also turned off. That is, the battery pack 1 is turned off.

The OR gate 103 receives the switch signals SG1 to SG3 and the power keeping signal PWR_KEEP, and when at least one of the received signals has the high level, the OR gate 103 generates the power enable signal PWR_EN of the high level.

The CAN transceiver 105 may transmit information required for the operation of the vehicle 100 to the controller 30 through the CAN communication, and transmit the information required for the control of the battery pack 1 received from the controller 30 through the CAN communication to the calculating unit 104. For example, when the calculating unit 104 determines the mode of the battery pack 1 to the automatic shut-down mode, the CAN transceiver 105 may notify the controller 30 that the battery pack 1 enters the automatic shut-down mode.

Figure 3:
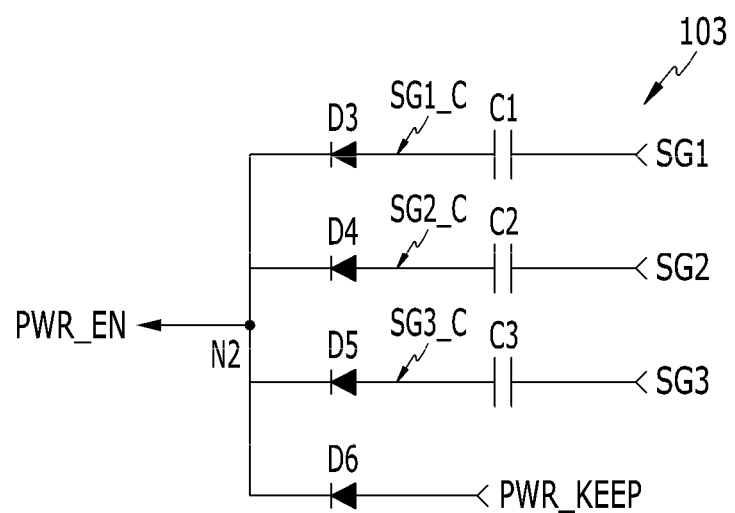
FIG. 3 is a diagram illustrating an OR gate according to an exemplary embodiment.

FIG. 3 is a diagram illustrating the OR gate according to the exemplary embodiment.

As illustrated in FIG. 3, the OR gate 103 includes three capacitors C1 to C3 and four diodes D3 to D6.

The switch signal SG1 is input to one electrode of the capacitor C1, and the other electrode of the capacitor C1 is connected to an anode of the diode D3. The switch signal SG2 is input to one electrode of the capacitor C2, and the other electrode of the capacitor C2 is connected to an anode of the diode D4. The switch signal SG3 is input to one electrode of the capacitor C3, and the other electrode of the capacitor C3 is connected to an anode of the diode D5. The power keeping signal PWR_KEEP is supplied to an anode of the diode D6.

Cathodes of the diodes D3 to D6 are connected to a node N2, and a voltage level of the power enable signal PWR_EN is determined according to a voltage of the node N2.

The capacitors C1 to C3 are filters, and allow only an alternating-current component to pass. For example, when the level of the switch signal SG1 is increased, a signal SG1_C passing through the capacitor C1 is generated in the form of a high-level pulse. Then, the diode D3 is electrically conducted during the high-level pulse of the signal SG1_C, so that the power enable signal PWR-EN becomes the high-level pulse.

The diode D6 is electrically conducted during the high-level pulse of the power keeping signal PWR_KEEP, so that the power enable signal PWR-EN is maintained with the high level.

Hereinafter, the operations of the OR gate 103 and the calculating unit 104 will be described with reference to FIG. 4.

Figure 4:
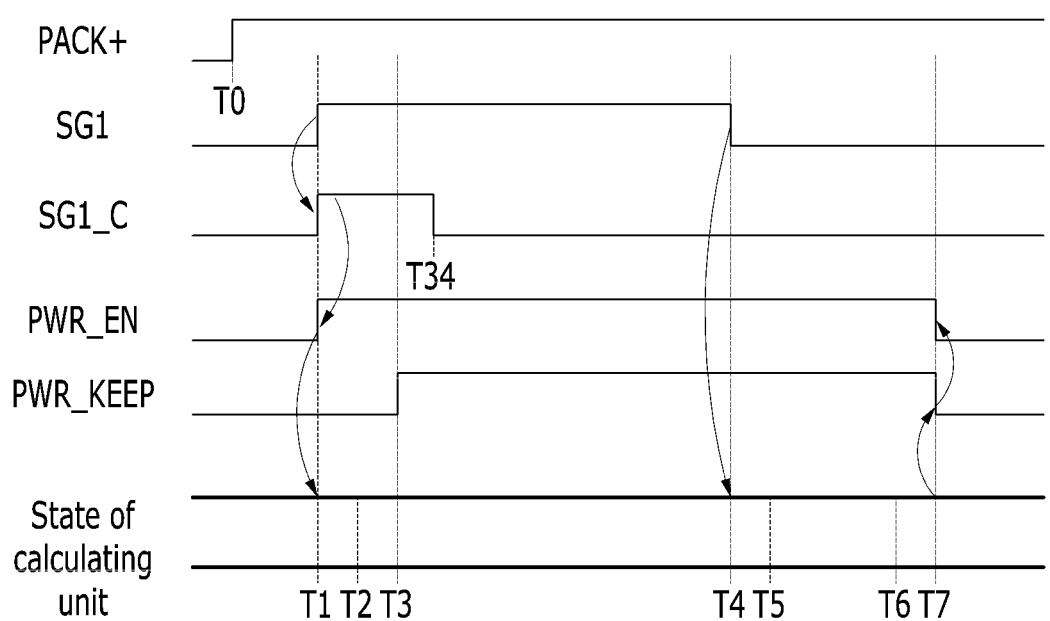
FIG. 4 is a waveform diagram illustrating waveforms of signals according to an exemplary embodiment.

FIG. 4 is a waveform diagram illustrating waveforms of the signals according to the exemplary embodiment.

In FIG. 4, it is illustrated that the switch signal SG1 is enabled, but the present invention is not limited thereto.

At time T0, voltage PACK+ of the high level is output by the voltage of the P+ terminal or the B+ terminal. Then, voltage PACK+ of the high level is supplied to the switch unit 40, so that the switch signal becomes the state where the switch signal according to the turned-on switch among the switches of the switch unit 40 may be enabled.

At time T1, the switch signal SG1 is enabled, so that the level of the switch signal SG1 is increased to the high level. The switch signal SG1 passes through the capacitor C1 and the signal SG1_C is a high-level pulse during a period T1 to T34.

At time T1, the OR gate 103 generates the power enable signal PWR_EN of the high level according to the signal SG1_C. The calculating unit 104 is in an initialization state during a period T1 and T2, and may check an initial state of the battery pack 1. At time T3, at which a delay time period elapses from time T1, the calculating unit 104 increases the level of the power keeping signal PWR_KEEP to the high level.

At time T34, the level of the signal SG1_C is decreased to the low level, the power enable signal PWR_EN is maintained with the high level by the power keeping signal PWR_KEEP of the high level.

At time T4, the level of the switch signal SG1 is decreased to the low level. It is assumed that other switch signal SG2 and SG3 have the low levels. Then, the levels of all of the switch signals SG1 to SG3 become the low levels from time T4.

At time T5, the calculating unit 104 determines the automatic shut-down mode, and starts an operation for power off. For example, during a period T5 and T6, the calculating unit 104 may back up the information about the battery pack 1. At time T7, the calculating unit 104 decreases the level of the power keeping signal PWR_KEEP to the low level. Then, all of the inputs of the OR gate 103 have the low levels, so that the level of the power enable signal PWR_EN is decreased to the low level.

At time T7, the power enable switch PWR_S is turned off. From time T7, the output voltage Vout of the converter 102 is not generated, so that the calculating unit 104 and the CAN transceiver 105 are turned off and the BMS 10 is also turned off.

The switch unit 40 may be variously designed according to the vehicle 100.

Figure 5:
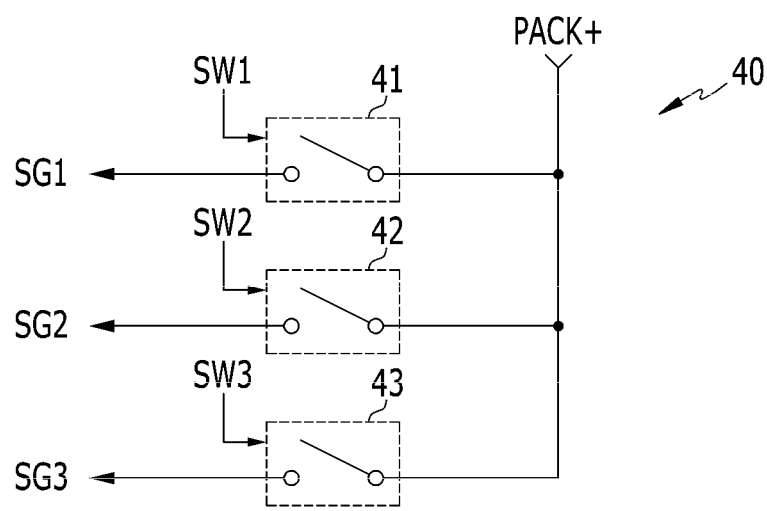
FIG. 5 is a diagram illustrating one example of a switch unit.

FIG. 5 is a diagram illustrating one example of the switch unit.

As illustrated in FIG. 5, the switch unit 40 may include three switches 41 to 43. The switch 41 may be switched by a signal SW1, and includes one end, to which voltage PACK+ is supplied, and the other end, which is electrically connected to the OR gate 103. The switch 42 may be switched by a signal SW2, and includes one end, to which voltage PACK+ is supplied, and the other end, which is electrically connected to the OR gate 103. The switch 43 may be switched by a signal SW3, and includes one end, to which voltage PACK+ is supplied, and the other end, which is electrically connected to the OR gate 103.

When an operation of turning on the ignition key is generated, a level of the signal SW1 becomes a high level, so that the switch 41 may be turned on. When an operation of turning on the switch controlling the vehicle 100 to move for tow is generated, a level of the signal SW2 becomes a high level, so that the switch 42 may be turned on. When an operation of stepping on the pedal for adjusting a speed is generated, a level of the signal SW3 becomes a high level, so that the switch 43 may be turned on.

The switch unit 40 according to the exemplary embodiment is not limited thereto.

Figure 6:
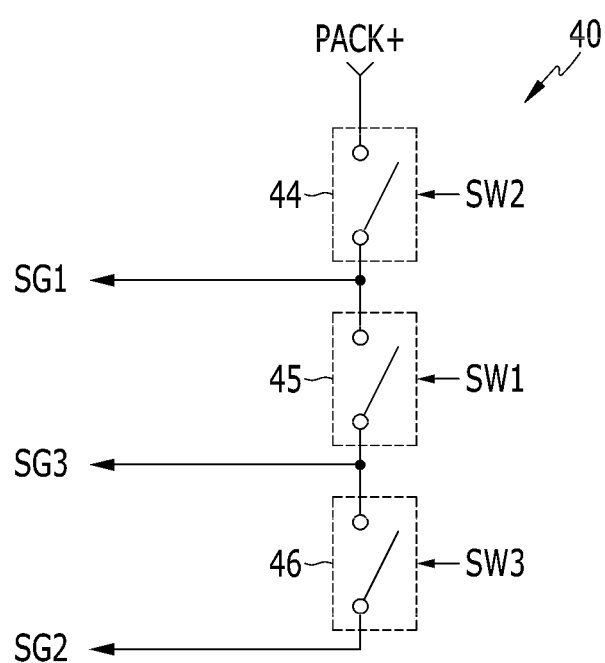
FIG. 6 is a diagram illustrating another example of the switch unit.

FIG. 6 is a diagram illustrating another example of the switch unit.

As illustrated in FIG. 6, the switch unit 40 may include three switches 44 to 46. The switch 44 may be switched by a signal SW2, and includes one end, to which voltage PACK+ is supplied and the other end which is electrically connected to the OR gate 103. The switch 45 is switched by a signal SW1, and includes one end, which is connected to the other end of the switch 44, and the other end, which is electrically connected to the OR gate 103. The switch 46 is switched by a signal SW3, and includes one end, which is connected to the other end of the switch 45, and the other end, which is electrically connected to the OR gate 103.

The case where the signals SW1 to SW3 of the high level are generated is the same as the case described with reference to FIG. 5, so that the description thereof will be omitted.

As described above, an operation mode of the battery pack is determined according to the enabled signals among the switch signals, which wake up the battery pack, so that it is possible to maximize the use of the battery pack by a user.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:
1. A battery pack, comprising:
   at least one battery module including a plurality of battery cells; and
   a battery management system (BMS) configured to determine an operation mode of the battery pack according to an enabled switch signal between at least two switch signals, which are to wake up the battery pack, and control the battery pack according to the determined operation mode,
   wherein the BMS includes:
      a power enable switch, which is to be switched according to the at least two switch signals; and a calculating unit, which is to receive the enabled switch signal between the at least two switch signals and to determine the operation mode according to the enabled switch signal between the at least two switch signals, and wherein the calculating unit is configured to differently control a control condition for determining the operation mode as an automatic shut-down mode according to the enabled switch signal between the at least two switch signals.

2. The battery pack of claim 1, wherein the BMS further includes a converter, which is to convert an input voltage supplied through the power enable switch, generate an output voltage, and supply the generated output voltage to the calculating unit.

3. The battery pack of claim 2, wherein:
the BMS further includes an OR gate, which is to generate a power enable signal according to the at least two switch signals and a power keeping signal.

4. The battery pack of claim 3, wherein:
the calculating unit is synchronized to the enabled switch signal between the at least two switch signals and is to generate the power keeping signal.

5. The battery pack of claim 4, wherein:
the calculating unit is to generate the power keeping signal after a predetermined delay time elapses from a time, at which one of the at least two switch signals is enabled.

6. The battery pack of claim 3, wherein:
the OR gate includes:
at least two capacitors including one electrodes, respectively, to which the at least two switch signals are input, respectively;
at least two first diodes including anodes connected to the other electrodes of the at least two capacitors, respectively, and cathodes connected to a first node; and
a second diode including an anode, to which the power keeping signal is supplied, and a cathode connected to the first node, and
the power enable signal is determined according to a voltage of the first node.

7. The battery pack of claim 6, wherein:
the enabled switch signal between the at least two switch signals passes through a corresponding capacitor between the at least two capacitors and a corresponding first diode between the at least two first diodes is electrically conducted by the signal passing through the corresponding capacitor, so that a level of the power enable signal is increased to a high level.

8. The battery pack of claim 7, wherein:
the calculating unit is to synchronize to the enabled switch signal between the at least two switch signals and is to generate the power keeping signal, and
the second diode is to be electrically conducted by the power keeping signal, so that the level of the power enable signal is maintained with the high level.

9. The battery pack of claim 2, wherein:
the BMS includes a controller area network (CAN) transceiver, which is to transmit information about the battery pack to the outside and receive information from the outside through CAN communication, and
the converter is to supply the output voltage to the CAN transceiver.

10. The battery pack of claim 1, wherein:
the BMS includes:
a first diode including an anode, to which a voltage of a first terminal is input, and a cathode, which is connected to a first node; and
a second diode including an anode, to which a voltage of a second terminal is input, and a cathode, which is connected to the first node, and
enable levels of the at least two switch signals are determined according to a voltage supplied through an electrically conducted diode between the first diode and the second diode.

11. The battery pack of claim 1, wherein:
when the at least two switch signals are enabled, the BMS is to determine an operation mode of the battery pack according to a priority of the at least two switch signals.

12. A method of managing a battery pack including at least one battery module including a plurality of battery cells, the method comprising:
receiving an enabled switch signal between at least two switch signals, which wake up the battery pack;
switching a power enable switch according to the at least two switch signals;
receiving, by a calculating unit, the enabled switch signal between the at least two switch signals;
determining, by the calculating unit, an operation mode of the battery pack according to the enabled switch signal; and
controlling the battery pack according to the determined operation mode,
wherein the determining includes differently controlling a control condition for determining the operation mode as an automatic shut-down mode according to the enabled switch signal between the at least two switch signals.

13. The method of claim 12, further comprising converting an input voltage supplied through the power enable switch and generating an output voltage.

14. The method of claim 13, wherein the switching includes:
the calculating unit being synchronized to the enabled switch signal between the at least two switch signals and generating a power keeping signal;
generating a power enable signal according to the at least two switch signals and the power keeping signal; and
switching the power enable switch according to the power enable signal.

15. The method of claim 12, wherein:
the determining of the operation mode includes, when the at least two switch signals are enabled, determining the operation mode of the battery pack according to a priority of the at least two switch signals.

16. A vehicle, comprising:
a battery pack, the battery pack including:
at least one battery module including a plurality of battery cells,
a power enable switch to be switched according to at least two switch signals, and
a calculating unit to receive an enabled switch signal between the at least two switch signals and to determine an operation mode according to the enabled switch signal between the at least two switch signals; and
a switch unit, which is to generate the at least two switch signals according to an external operation,
wherein the calculating unit is further configured to differently control a control condition for determining the operation mode as an automatic shut-down mode according to the enabled switch signal between the at least two switch signals.

17. The vehicle of claim 16, wherein:
the external operation includes at least one selected from an operation of turning on an ignition key of the vehicle, an operation of turning on a switch controlling the vehicle to move for tow, and an operation of stepping on an accelerator pedal for adjusting a speed of the vehicle.

18. The vehicle of claim 16, wherein:
the battery pack is to be woken up according to the at least two switch signals.

19. The vehicle of claim 16, wherein:
the switch unit includes at least two switches, each of which includes a first end to which a voltage is supplied from the battery pack, and the at least two switch signals are supplied to the battery pack when the at least two switches are turned on.

20. The vehicle of claim 19, wherein the battery pack includes:
at least two capacitors including first electrodes connected to second ends of the at least two switches, respectively; and
at least two diodes connected to second electrodes of the at least two capacitors, respectively.

* * * * *